(12) United States Patent
Hughes

(10) Patent No.: US 9,069,639 B2
(45) Date of Patent: Jun. 30, 2015

(54) MANAGING A USER PROXY CONFIGURATION IN A DAEMON THAT FREQUENTLY LOADS AND UNLOADS

(75) Inventor: Richard Hughes, London (GB)

(73) Assignee: Red Hat, Inc., Raleigh, NC (US)

( * ) Notice: Subject to any disclaimer, the term of this patent is extended or adjusted under 35 U.S.C. 154(b) by 761 days.

(21) Appl. No.: 12/712,463

(22) Filed: Feb. 25, 2010

(65) Prior Publication Data
US 2011/0209141 A1     Aug. 25, 2011

(51) Int. Cl.
*G06F 9/44*     (2006.01)
*G06F 9/445*     (2006.01)
*G06F 7/53*     (2006.01)

(52) U.S. Cl.
CPC ... *G06F 8/65* (2013.01); *G06F 7/53* (2013.01)

(58) Field of Classification Search
CPC .......................................................... G06F 9/44
USPC ................................................. 717/168–173
See application file for complete search history.

(56) References Cited

U.S. PATENT DOCUMENTS

| | | | | |
|---|---|---|---|---|
| 6,253,243 | B1 * | 6/2001 | Spencer ........................ | 709/224 |
| 6,314,460 | B1 * | 11/2001 | Knight et al. ................. | 709/220 |
| 7,007,080 | B2 * | 2/2006 | Wilson .......................... | 709/221 |
| 7,600,230 | B2 * | 10/2009 | Desai et al. .................... | 719/311 |
| 2002/0007460 | A1 * | 1/2002 | Azuma ......................... | 713/201 |
| 2002/0061021 | A1 * | 5/2002 | Dillon .......................... | 370/390 |
| 2003/0069857 | A1 * | 4/2003 | Junda .............................. | 705/74 |
| 2004/0117493 | A1 * | 6/2004 | Bazot et al. ................... | 709/229 |
| 2005/0138204 | A1 * | 6/2005 | Iyer et al. ..................... | 709/242 |
| 2007/0058792 | A1 * | 3/2007 | Chaudhari et al. ......... | 379/88.17 |
| 2008/0066168 | A1 * | 3/2008 | Gregg et al. ..................... | 726/7 |
| 2010/0157990 | A1 * | 6/2010 | Krzyzanowski et al. ..... | 370/352 |
| 2011/0138015 | A1 * | 6/2011 | Adriazola ..................... | 709/219 |

OTHER PUBLICATIONS

Hughes, Richard, "What is PackageKit?" http://www.packagekit.org/pk-intro.html, 2 pages, printed from Internet on Feb. 25, 2010.
Hughes, Richard, "PackageKit" Package Abstraction Framework, Feb. 24, 2008, pp. 1, 44-72, http://www.hughsie.com/public/introduction-to-packagekit.pdf.

* cited by examiner

*Primary Examiner* — Chat Do
*Assistant Examiner* — Jae Jeon
(74) *Attorney, Agent, or Firm* — Lowenstein Sandler LLP

(57) ABSTRACT

A user proxy setting is managed by a computer system that frequently performs package updates. A session starts when a user logs onto the computer system. The session registers the proxy setting of the user with a daemon that quits after a period of inactivity and restarts upon request. The daemon stores the proxy setting in a database using a user identifier (UID) and a session identifier as a key. The daemon then performs package updates multiple times during the session via a network, each time using the proxy setting stored in the database.

12 Claims, 4 Drawing Sheets

MANAGING A USER PROXY CONFIGURATION IN A DAEMON THAT FREQUENTLY LOADS AND UNLOADS

TECHNICAL FIELD

Embodiments of the present invention relate to computer systems, and more specifically, to the management of user proxy settings in a computer system.

BACKGROUND

Computers typically use a package distribution tool to install, update, and remove packages and their dependencies. Examples of package distribution tools include YUM, APT, CONARY®, etc. A package management application, such as PackageKit, can provide an abstract layer over the package distribution tools to unify graphical user interfaces (GUIs) and text mode managers used in these package distribution tools.

A package management application can be used for boot time security updates, automatic installation of files (e.g., clipart), installation of new features (e.g., smart-card readers), allowing unprivileged users to install software, opening unknown file formats, removing dependencies for files, etc. Depending upon a user's privilege level, the user may perform some or all of the above tasks through the package management application.

An administrator of a computer system can specify what a user can and cannot do by setting the user's privilege level. For instance, an administrator can specify that an unprivileged user can update the system and conduct searching, but cannot install or remove packages. The user's privilege level can be set in the user's proxy setting. Conventionally, a user's client has to read the user's proxy setting and relay the proxy setting to a package update daemon at the start of every transaction (e.g., every package update). Reading and relaying the proxy setting makes the transaction slower to start up. Further, a client may request package updates multiple times in a session. Reading and relaying the proxy setting repeatedly in a session incurs significant overhead on the management of package updates.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for managing a user proxy setting. In one embodiment, the user proxy setting is managed by a computer system that frequently performs package updates. A session starts when a user logs onto the computer system. The session registers the proxy setting of the user with a daemon that quits after a period of inactivity and restarts upon request. The daemon stores the proxy setting in a database using a user identifier (UID) and a session identifier as a key. During the session, the daemon performs package updates multiple times during the session via a network, each time using the proxy setting stored in the database.

In one embodiment, the daemon is part of a package management application. The daemon sets a network proxy to allow packages to be downloaded from servers via a corporate or managed network. The daemon sets the network proxy based on a proxy setting in the user's configuration. This proxy setting is read by a session process that starts when the user logs in. The proxy setting is then relayed to the daemon.

The user's proxy setting can be used throughout the entire session process. During a session, the user's client may request multiple package updates; that is, multiple transactions (e.g., download, search or remove packages). Instead of providing the daemon with the user's proxy setting each time an update is requested, embodiments of the present invention provide the daemon with the proxy setting only once. The daemon stores the user identifier (UID) and the session from which the update request came in a database. When each transaction method is executed, the UID and the ID of the session (that executed the call to the transaction method) are used to lookup the user proxy setting in the database. The user proxy setting is then passed to the back-end of the package management application to determine a user's privilege level. Storing the proxy setting in the database allows the daemon to have the correct proxy setting if the daemon times out after a period of inactivity and is restarted by a client application. In one embodiment, the package management application is the PackageKit and the daemon is the packagekit daemon. Other embodiments of the package management application and the daemon may also be used.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
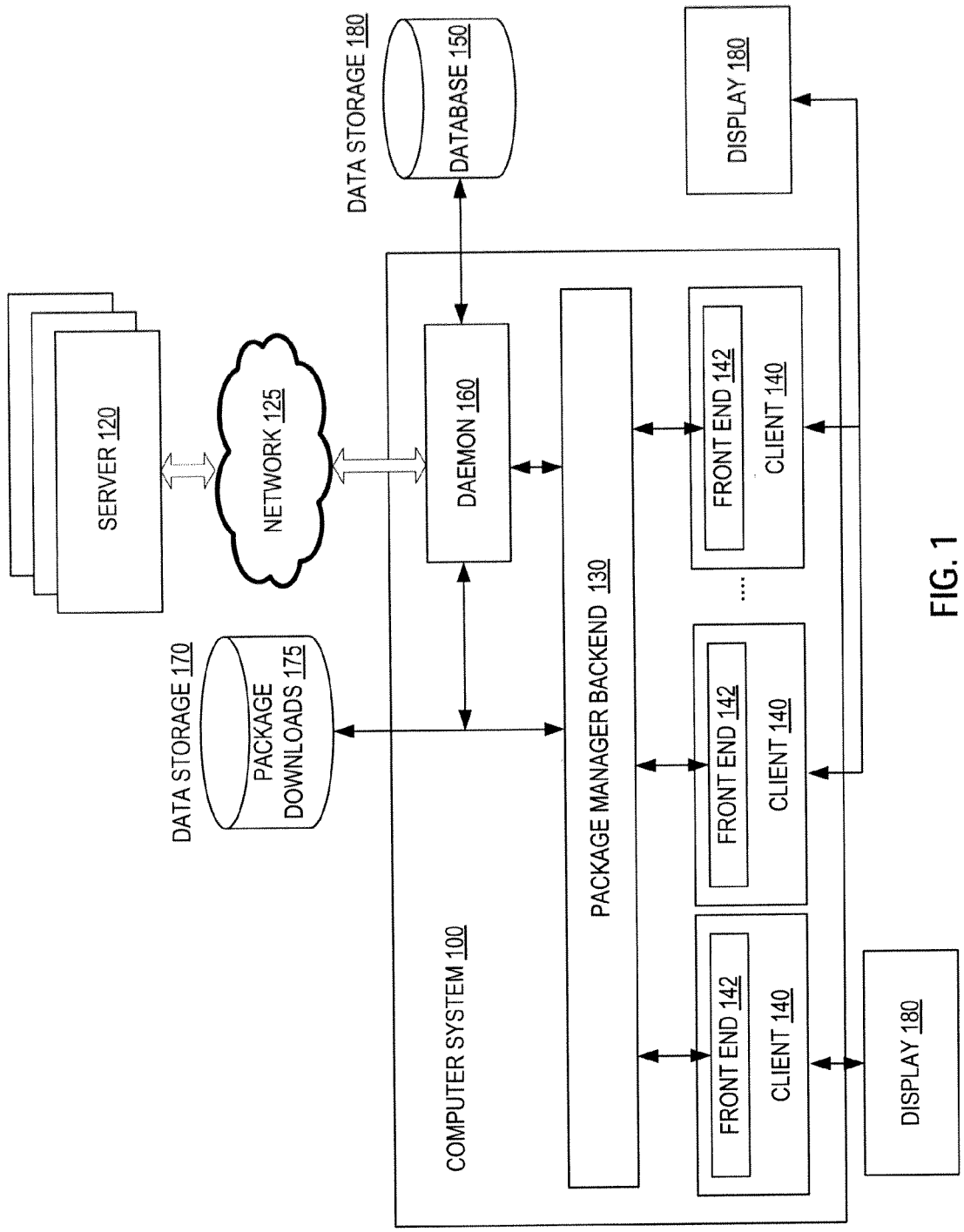
FIG. 1 illustrates a network architecture in which embodiments of the present invention may be implemented.

FIG. 1 illustrates an exemplary network architecture in which embodiments of the present invention may operate. In one embodiment, the network architecture includes a computer system 100 coupled to a number of servers 120 via a network 125. The computer system 100 hosts a number of clients 140, with each client 140 interacting with a user via a front-end application ("front-end") 142. In one embodiment, the front-end 142 provides a graphical user interface (GUI) that allows the user to manage updates to software packages that are made available by the servers 120. The GUI may be viewed by the user on the display 180. Some of the clients 140 may be coupled to the same display 180 while some of the other clients may be coupled to different displays 180. The front-ends 142 on all of the clients 140 communicate with a package manager back-end 130 that manages low-level details of package management, such as I/O, memory allocation, etc.

In one embodiment, the computer system 100 hosts a daemon 160 that is responsible for updating packages. The daemon 160 may query an authorizing daemon (e.g., PolicyKit) (not shown) to determine whether a user is allowed to perform an update, whether the user's request needs to go through a proxy server, etc. The authorizing daemon may be co-located with the daemon 160 on the computer system 100. The authorizing daemon contains a list of rules that indicate what users are allowed to do. Depending on the privilege level of the user, a user may be allowed to search, download, remove and/or install a package. A session, which starts when the user logs in, registers the user proxy setting with the daemon 160. The proxy setting contains information on the user's privilege level and other authentication information. The authentication information is necessary for a package update to succeed. Typically, the servers 120, from which packages are downloaded, check the authentication information before allowing the daemon 160 to access their data. The daemon 160 stores the proxy setting into a database 150 located in data storage 180, and uses the stored proxy setting for subsequent updates requested by the user's session. Using the proxy setting, the daemon 160 performs the requested updates and saves package downloads 175 (if there is any) in data storage 170.

In one embodiment, the computer system 100 may be a computer (e.g., a server, a workstation, a personal computer (PC), a laptop, etc.), a mobile phone, a hand-held computing device, a game station, a personal digital assistant (PDA), etc. The network 125 may be a private network (e.g., a local area network (LAN)), wide area network (WAN), intranet, etc.) or a public network (e.g., the Internet). The network 125 may be wired, wireless, or a combination of both. The data storage 170 and 180 include non-volatile data storage devices, such as flash drives, magnetic or optical storage based disks, tapes or hard drives. It is noted that any number of clients and servers may be implemented.

Figure 2:
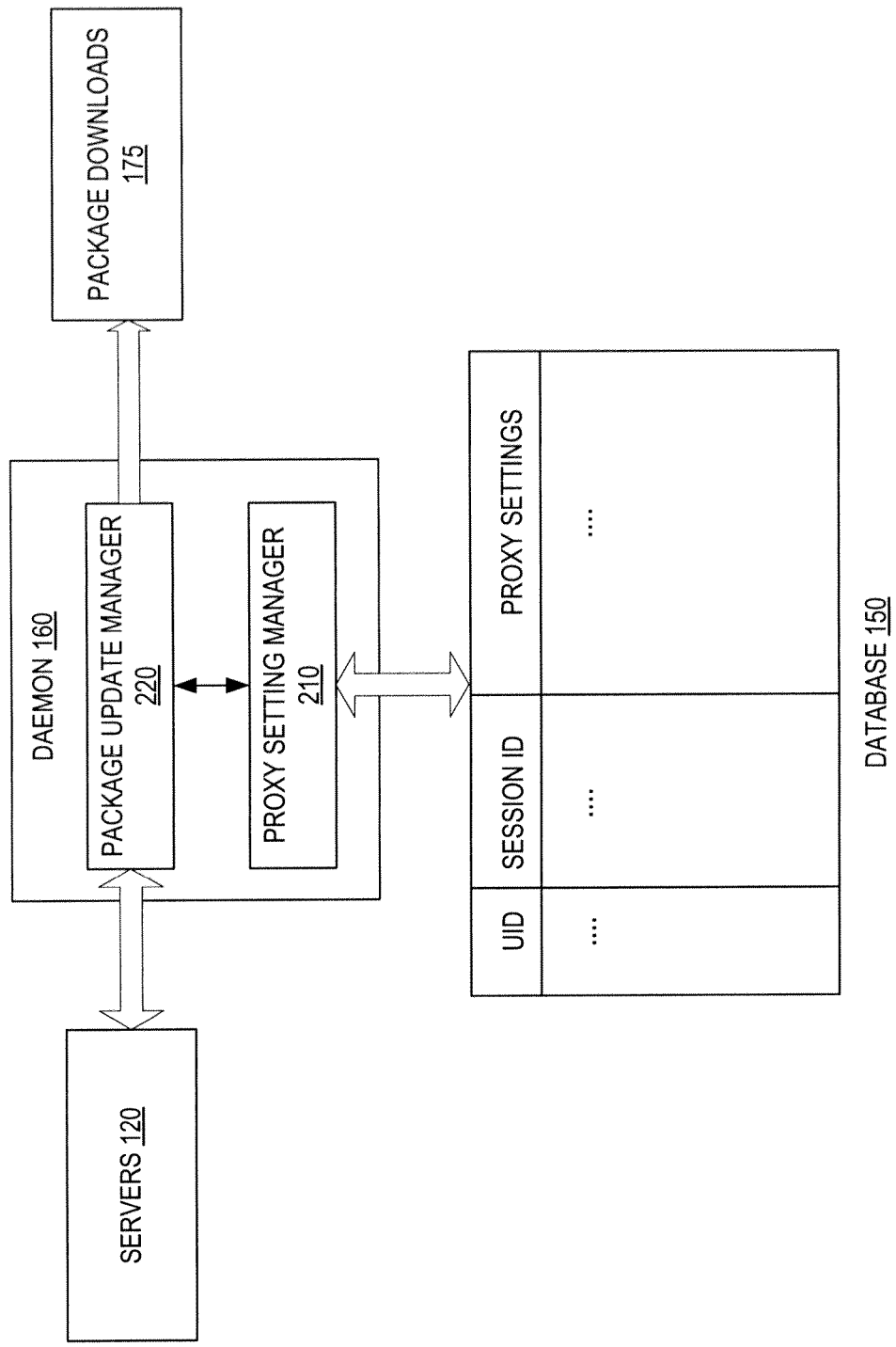
FIG. 2 is a block diagram of one embodiment of a daemon that stores user proxy settings in a database.

FIG. 2 illustrates an embodiment of the daemon 160 that includes a proxy setting manager 210 and a package update manager 220. The proxy setting manager 210 stores user proxy settings in the database 150, and retrieves the appropriate proxy setting when an update request is received from a user. As described above, when an update request is received, the daemon 160 first determines (e.g., by consulting the rules in PolicyKit) whether the user is allowed to perform the update. If the user is allowed to perform the update, in one embodiment, the proxy setting manager 210 retrieves the appropriate proxy setting using the user's identifier (UID) and session ID as the key. Thereafter, with the retrieved proxy setting, the package update manager 220 performs the requested update. If the requested update is to download a package, the downloaded package 175 is stored in a local storage.

In one embodiment, the UID and the session ID identify a user and a session, respectively. Each session may have multiple transactions for package download, update, search, removal, etc. As the proxy settings are stored in the database 150, the daemon 160 only needs to obtain the proxy setting from the user's session once. In one embodiment, the daemon 160 may quit after a period of time of inactivity. For example, the inactivity may be detected when there is no activity at the front-end 142. The daemon 160 re-starts when a new activity is detected; for example, when the user requests a search via the front-end 142. The proxy setting stored in the database 150 is unaffected by the activity (quits and starts) of the daemon 160. The stored proxy setting can be reused again and again throughout the session.

Figure 3:
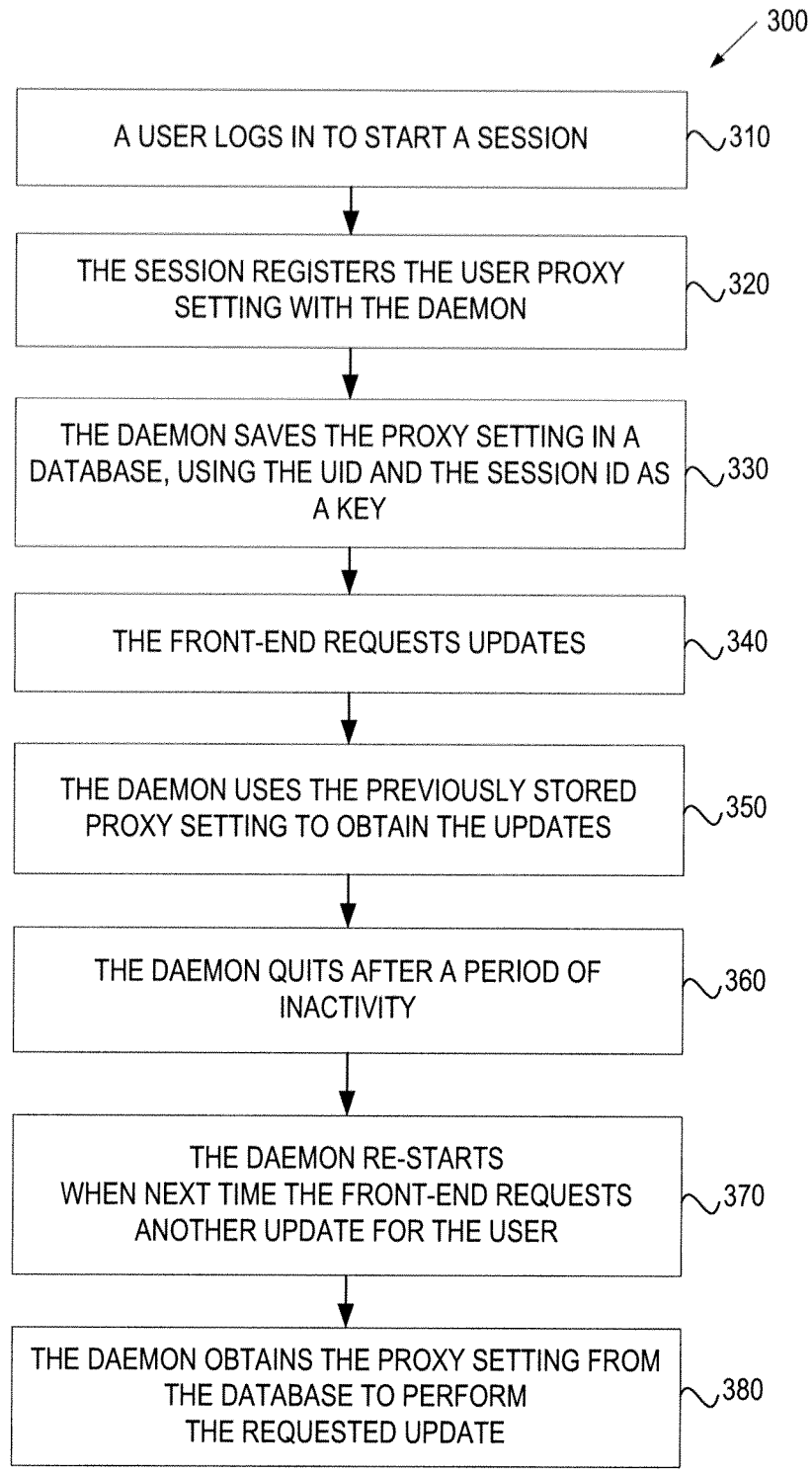
FIG. 3 is a flow diagram illustrating one embodiment of a method for managing a user's proxy setting.

FIG. 3 is a flow diagram illustrating one embodiment of a method 300 for managing user proxy settings. The method 300 may be performed by computer system 400 of FIG. 4 that may comprise hardware (e.g., circuitry, dedicated logic, programmable logic, microcode, etc.), software (e.g., instructions run on a processing device), or a combination thereof. In one embodiment, the method 300 is performed by the computer system 100 of FIG. 1.

Referring to FIG. 3, in one embodiment, the method 300 begins when a user logs in to start a session (block 310). The user has a proxy setting that may be stored in a configuration file. The configuration file may be set by a system administrator or someone that can login as the root. The session reads the user's proxy setting from the configuration file and registers the proxy setting with the daemon 160 (block 320). In an embodiment where GNU Object Model Environment (GNOME) is implemented, the reading and registering of the proxy setting can be performed by a gpk-update-icon process, which reads the settings from GConf, and executes SetProxy on org.freedesktop.PackageKit. The daemon 160 then saves the user's proxy setting in the database 150, using the UID and the session ID as the key (block 330).

While the session is active, the front-end 142 associated with the user sends an update request to the daemon 160 (block 340). The daemon 160 consults an authorizing daemon (e.g., PolicyKit) to determine whether the suer is allowed to perform the update. If the user is allowed, the daemon 160 uses the previously-stored proxy setting to obtain the requested updates from the servers 120 (block 350). For example, the proxy setting may contain a mail proxy password, which allows the user to access mail on a mail server. The daemon 160 then obtains the updates and stores the updates in local storage.

In one embodiment, the daemon 160 quits after a period of inactivity at the front-end 142 (block 360). For example, the daemon 160 may quit when the user exits from a text mode or graphical tool provided by the front-end 142 for a time period that exceeds a threshold. When the daemon 160 quits, it relinquishes its memory to the system. The relinquishment of the memory allows the computer system 100 to reuse the memory space assigned to the daemon 160. The data stored in the database 150 remains after the daemon 160 quits. The next time the front-end 142 requests another update, the daemon 160 re-starts (block 370). The daemon 160 retrieves the proxy setting from the database 150 to obtain the requested updates (block 380). Therefore, it is not necessary for the user's session to send the user's proxy setting every time it requests for an update.

Figure 4:
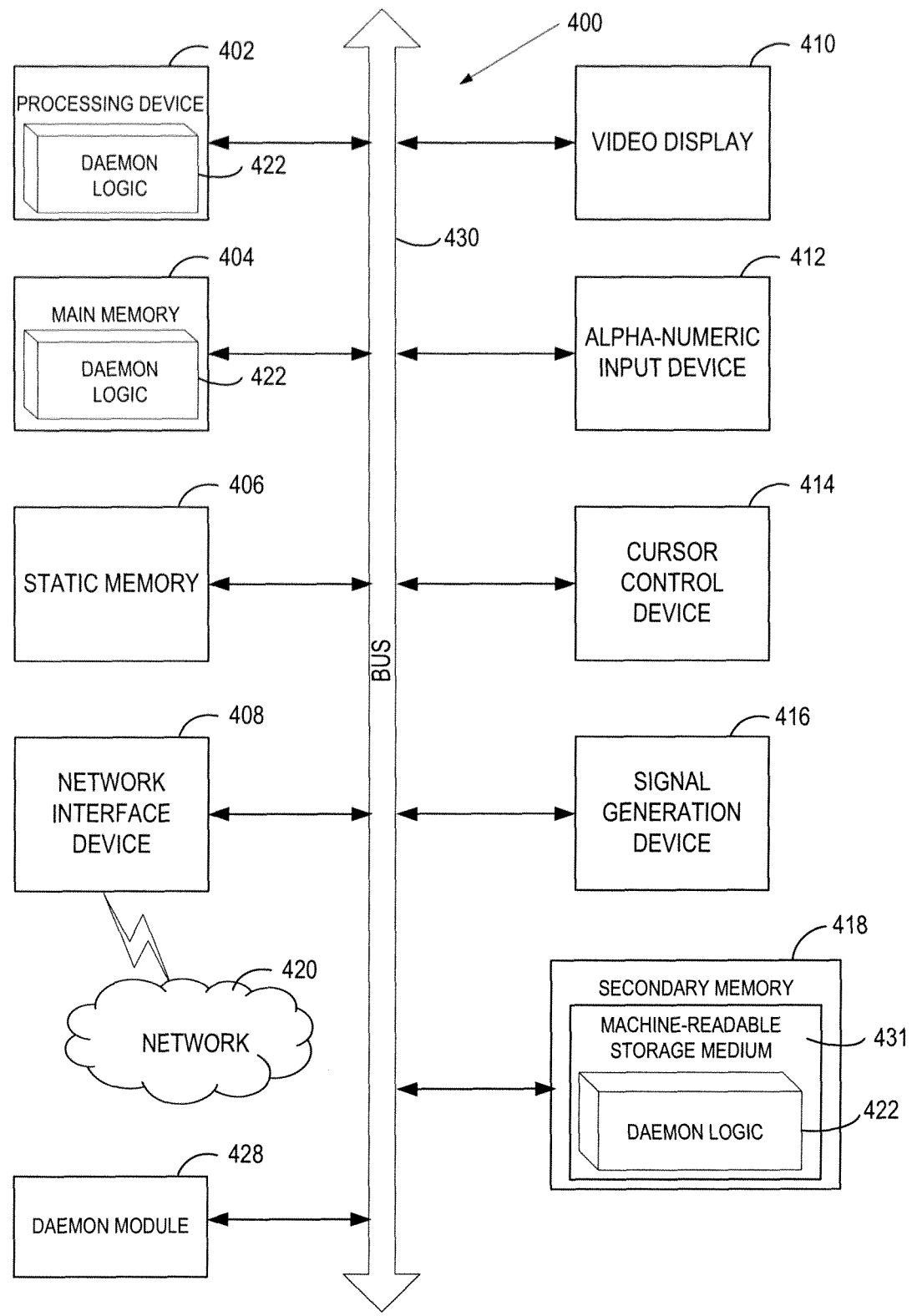
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a comp ex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute daemon logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., daemon logic 422) embodying any one or more of the methodologies or functions described herein (e.g., the daemon 160 of FIG. 1). The daemon logic 422 may also reside, completely or at least partially, within the main memory 404 and/or within the processing device 402 during execution thereof by the computer system 400; the main memory 404 and the processing device 402 also constituting machine-readable storage media. The daemon logic 422 may further be transmitted or received over a network 420 via the network interface device 408.

The machine-readable storage medium 431 may also be used to store the daemon logic 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that stores the one or more sets of instructions. The term "machine-readable storage medium" shall also be taken to include any medium that is capable of storing or encoding a set of instructions for execution by the machine that causes the machine to perform any one or ore of the methodologies of the present invention. The term "machine-readable storage medium" shall accordingly be taken to include, but not be limited to, solid-state memories, and optical and magnetic media.

The computer system 400 may additionally include a daemon module 428 for implementing the functionalities of the daemon 160 of FIG. 1. The module 428, components and other features described herein (for example in relation to FIG. 1) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "starting", "registering", "storing", "updating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:
1. A method comprising:
starting, by a processing device, a session when a user logs onto a computer system comprising the processing device, wherein multiple package updates occur during the session, and wherein the package updates comprise package search, package download, and package removal;

querying an authorizing daemon to determine whether the user is authorized to perform a first package update in view of a rule that indicates whether the user is authorized to perform the first package update;

registering a user proxy setting with a daemon module that is executed by the processing device, wherein the daemon module stores the proxy setting in a database, and wherein the user proxy setting comprises a privilege level of the user;

determining the privilege level of the user in view of the user proxy setting;

determining that the user is authorized to perform the first package update in view of the privilege level of the user;

in response to determining that the user is authorized to perform the first package update:
 determining that a period of inactivity of the user within a user interface when the user exits from a text mode or graphical tool of a front-end for management of the package updates exceeds a threshold; and
 in response to determining that the period of inactivity exceeds the threshold:
  quitting the daemon module; and
  relinquishing a memory space that was assigned to the daemon module when the daemon module quits, wherein relinquishing the memory space allows the computer system to reuse the memory space;

detecting a request for a second package update from the user; and restarting the daemon module in view of detecting the request for the second package update from the user, wherein the daemon module retrieves the proxy setting from the database to determine whether the user is authorized to perform the second package update in response to restarting, and wherein the daemon module is able to quit and restart multiple times during the session via a network each time using the retrieved user proxy setting.

2. The method of claim 1, wherein the computer system is accessed concurrently by multiple users, with each user having a different proxy setting stored in the database.

3. The method of claim 1, wherein the daemon module stores the user proxy setting in the database using a user identifier (UID) and a session identifier as a key.

4. The method of claim 1, further comprising:
reading the proxy setting from a configuration of the user once when the session starts.

5. A computer system comprising:
a memory to store a database; and
a processing device to communicate with the database to:
start a session when a user logs onto the computer system, wherein multiple package updates occur during the session, and wherein the package updates comprise package search, package download, and package removal;
query an authorizing daemon to determine whether the user is authorized to perform a first package update in view of a rule that indicates whether the user is authorized to perform the first package update;
register a user proxy setting with a daemon module that is executed by the processing device, wherein the daemon module stores the proxy setting in a database, and wherein the user proxy setting comprises a privilege level of the user;
determine the privilege level of the user in view of the user proxy setting;
determine that the user is authorized to perform the first package update in view of the privilege level of the user;
in response to the determination that the user is authorized to perform the first package update:
 determine that a period of inactivity of the user within a user interface when the user exits from a text mode or graphical tool of a front-end for management of the package updates exceeds a threshold; and
 in response to the determination that the period of inactivity exceeds the threshold:
  quit the daemon module; and
  relinquish a memory space that was assigned to the daemon module when the daemon module quits, wherein the relinquishment of the memory space allows the computer system to reuse the memory space;
detect a request for a second package update from the user; and
restart the daemon module in view of the detection of the request for the second package update from the user, wherein the daemon module retrieves the proxy setting from the database to determine whether the user is authorized to perform the second package update in response to the restart, and wherein the daemon module is able to quit and restart multiple times during the session via a network, each time using the retrieved user proxy setting.

6. The computer system of claim 5, wherein the computer system is accessed concurrently by multiple users, with each user having a different user proxy setting stored in the database.

7. The computer system of claim 5, wherein the daemon module stores the user proxy setting in the database using a user identifier (UID) and a session identifier as a key.

8. The computer system of claim 5, wherein the processing device is further to:
read the user proxy setting from a configuration of the user once when the session starts.

9. A non-transitory computer readable storage medium including instructions that, when executed by a processing device, cause the processing system to:
start, by the processing device, a session when a user logs onto a computer system comprising the processing device, wherein multiple package updates occur during the session, and wherein the package updates comprise package search, package download, and package removal;
query an authorizing daemon to determine whether the user is authorized to perform a first package update in view of a rule that indicates whether the user is authorized to perform the first package update;
register a user proxy setting with a daemon module that is executed by the processing device, wherein the daemon module stores the proxy setting in a database, and wherein the user proxy setting comprises a privilege level of the user;
determine the privilege level of the user in view of the user proxy setting;
determine that the user is authorized to perform the first package update in view of the privilege level of the user;
in response to the determination that the user is authorized to perform the first package update:
 determine that a period of inactivity of the user within a user interface when the user exits from a text mode or graphical tool of a front-end for management of the package updates exceeds a threshold; and in response to the determination that the period of inactivity exceeds the threshold:
quit the daemon module; and
relinquish a memory space that was assigned to the daemon module when the daemon module quits, wherein the relinquishment of the memory space allows the computer system to reuse the memory space;
detect a request for a second package update from the user; and
restart the daemon module in view of the detection of the request for the second package update from the user, wherein the daemon module retrieves the proxy setting from the database to determine whether the user is authorized to perform the second package update in response to the restart, and wherein the daemon module is able to quit and restart multiple times during the session via a network, each time using the retrieved user proxy setting.

10. The non-transitory computer readable storage medium of claim 9, wherein the computer system is accessed concurrently by multiple users, with each user having a different proxy setting stored in the database.

11. The non-transitory computer readable storage medium of claim 9, wherein the daemon module stores the user proxy setting in the database using a user identifier (UID) and a session identifier as a key.

12. The non-transitory computer readable storage medium of claim 9, wherein the processing device is further to:
read the user proxy setting from a configuration of the user once when the session starts.

\* \* \* \* \*